Oct. 15, 1940.　　　N. KASDAN　　　2,217,908

VANITY CASE

Filed June 15, 1939

INVENTOR
Nathan Kasdan
BY
ATTORNEY

Patented Oct. 15, 1940

2,217,908

UNITED STATES PATENT OFFICE 2,217,908

VANITY CASE

Nathan Kasdan, New York, N. Y., assignor to Majestic Metal Specialties, Inc., Moosup, Conn., a corporation of Connecticut Application June 15, 1939, Serial No. 279,246

3 Claims. (Cl. 132—79)

This invention relates to vanity cases and has for an object to provide an attractive device of this class which is easy to open without the risk of breaking a thumb or finger nail.

Referring to the drawing.

Figure 1:
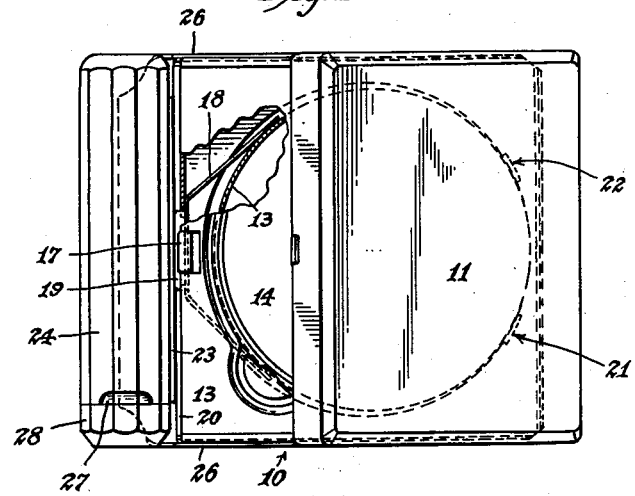
Fig. 1 is a top plan view of one embodiment of this invention with the cover partly open.
Figure 2:
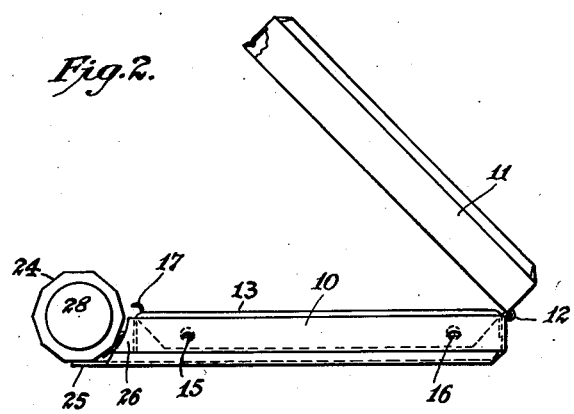
Fig. 2 is a side view of the device of Fig. 1.
Figure 3:
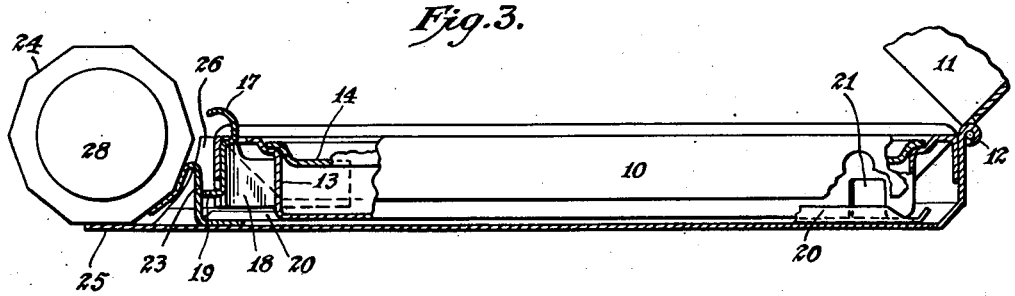
Fig. 3 is an enlarged view partly in section of the device of Fig. 2, but with the cover more widely open.

Vanity case 10 includes an outer casing having cover 11 hingedly secured thereto at 12. Within the casing is a powder receptacle 13 forming a deck member and a recess for powder. An inner cover 14 is also desirable for closing the powder receptacle against egress of powder, so as to prevent loose powder from being mixed accidentally with rouge or whatever else may be carried in the case. Inwardly stamped portions 15 and 16 secure the outer casing and powder receptacle together yieldably against relative movement, as is customary in this art. The side of the casing away from the cover hinge 12 is provided with a latch 17 for retaining the cover closed. This latch is of ordinary construction, the same being yieldable against leaf spring portions 18. Instead of the usual forwardly projecting thumbnail portion or actuator, the latch of this invention has a forwardly extending actuator portion 19 which is substantially contiguous a bent portion of the slide 20. This slide 20 is located between the bottom of the powder receptacle and the bottom of the outer casing as shown more plainly in Fig. 3. At the rear, this slide is provided with upstanding lugs 21 and 22, contiguous the side walls of the powder receptacle and keeping the slide from moving outward or forward. The front portion of the slide is bent up as shown at 23 so as to lie contiguous the actuator portion 19 of the latch. Secured to the outer end portion of the slide is a handle 24 suitable for carrying a lipstick or other cosmetic. The handle 24 is thus capable of functioning as an enlarged handle for the cover latch, so that by pressing the handle 24 toward the latch 17, the slide 20 is made to move rearwardly a slight amount, or sufficient for the latch to be disengaged from the cover. The bottom of the outer casing has a forward extension 25 contiguous and under the handle 24. The side walls which extend away from the cover hinge also project between the front end of the powder receptacle and are shaped to the general contour of the handle 24, as shown by the numeral 26. The adjacent wall of the outer casing, that is, the wall close to the handle 24, is not present, so that the outer casing is open along this side, except in so far as it is closed by the side wall of the powder receptacle. The thumbnail recess 27 facilitates disengagement of the removable end portion 28 of the handle 24. In the preferred form the lipstick holder includes a cylindrical portion received within the outer wall 24, and a lower portion 28 which is rotatable with respect to this inner wall so that the lipstick carrier may be ejected or rejected by a screw thread cam type actuator which is old in this art.

Moving the handle 24 toward the vanity case stresses spring portions 18 and moves the latch 17 far enough to unlatch the cover. If the cover had a projection extending toward the handle, it might be engaged by a recess or projection on the handle, in which event the handle would move away from the vanity case to unlatch the cover.

I claim:

1. A vanity case comprising a powder receptacle, an outer casing, means securing the receptacle within the casing, a latch on the side of the casing opposite that along which the cover is hinged, a slide between the bottom of said receptacle and casing, said slide having upstanding lugs located between the cover hinge and powder receptacle and adapted to cooperate with said receptacle to prevent the slide moving outwardly, an elongated handle secured to said slide outside the casing, adjacent thereto and extending along the side thereof having the latch, whereby on pressing said elongated handle closer to the casing said latch may be released.

2. A vanity case comprising a powder receptacle, an outer casing, means securing the receptacle within the casing, a latch on the side of the casing opposite that along which the cover is hinged, a slide between the bottom of said receptacle and casing, said slide having upstanding lugs located between the cover hinge and powder receptacle and adapted to cooperate with said receptacle to prevent the slide moving outwardly, an elongated handle secured to said slide outside the casing, adjacent thereto and extending along the side thereof having the latch, whereby on pressing said elongated handle closer to the casing said latch may be released, said slide extending upwardly and bent adjacent said latch, the bottom of said casing being extended to overlap said elongated handle at least in part, the side of casing on which the latch is located being opened and closed by said handle, the latch being carried by said receptacle, and the sides of the casing which are substantially normal to the handle being extended to adjacent the handle and shaped to approximately the contour thereof.

3. A vanity case having a cover, a hinge connecting said case and cover along one side, an end wall closing said case on the side opposite said hinge, a handle of generally tubular shape carried by the vanity case, said handle being located outside of said end wall and substantially parallel therewith whereby the handle may be of larger diameter or thickness than it could if it were located within said vanity case with the cover closed, a latch adjacent said handle and carried by said case for engagement with a portion of the cover when closed to retain the cover against opening, said latch being yieldable in response to relative movement bodily between the handle and case for releasing the cover, a slide within the vanity case and on which said handle is secured, said latch cooperating with said slide on movement of said handle to release the cover.

NATHAN KASDAN.